Patented May 8, 1951

2,552,065

UNITED STATES PATENT OFFICE 2,552,065

OXYBISPHENYLSULFONHYDRAZIDE

Dwight L. Schoene, Woodbridge, Conn., assignor to United States Rubber Company, New York, N. Y., a corporation of New Jersey No Drawing. Application August 1, 1950, Serial No. 177,115

1 Claim. (Cl. 260—556)

This invention relates to the discovery of a new and useful organic compound which possesses unique and valuable properties. In particular, the invention involves the discovery that a new chemical compound which can be readily produced from hydrazine and p,p'-oxybis (benzene sulfonyl chloride) possesses the useful property of being unusually stable under normal storage conditions but upon heating undergoes a moderately rapid decomposition to produce nitrogen gas. Specifically, the invention lies in the discovery of p,p'-oxybis (benzene sulfonyl hydrazide) as a new and unique composition of matter.

Certain organic compounds which decompose at moderately elevated temperatures to produce a gaseous decomposition product have found use as "blowing agents" in the manufacture of cellular rubber and cellular plastics. Not all compounds which produce gas on heating are suitable for the purpose, however. For example, many compounds which decompose on heating may do so explosively and are unsafe for use. Other chemicals decompose at temperatures either too high or too low to meet the requirements of practical use. A very important requirement for blowing agents for cellular rubber, for example, is that the decomposition temperature be such that partial, but incomplete vulcanization of the rubber shall have occurred prior to the decomposition of the blowing agent. Otherwise, the rubber stock will not have developed sufficient strength to retain the blowing gas or will have been cured to such an extent that proper expansion by this gas is not possible. Related to this requirement is the requirement that the blowing agent shall not have an adverse effect on the rate of vulcanization of the rubber composition—an effect which would seriously alter the desired cellular structure of the product. Another requirement of a superior blowing agent is that the blowing agent shall not produce discoloration of the product nor cause staining of coatings or other materials that come in contact with the blown product. A further requirement is that the blowing agent will not produce odorous, toxic, or otherwise objectionable decomposition products in the sponge. Although a number of compounds have been proposed as non-discoloring blowing agents none of the materials that have been introduced is completely satisfactory.

It has now been found that p,p'-oxybis (benzene sulfonyl hydrazide) is an outstanding blowing agent for the manufacture of both cellular rubber and cellular plastics. The chemical possesses the properties required for this application to a degree that is unique and not found in other classes of blowing agents. Certain sulfonhydrazides such as methane sulfonyl hydrazide and benzene sulfonyl hydrazide decompose at suitable temperatures to produce gas and are capable of producing cellular plastics. However, the decomposition products are odorous and the use of the materials is greatly limited thereby. Naphthalene - 2,7 - disulfonyl hydrazide decomposes to give decomposition products having little odor but the material is difficult to obtain in a pure form and tends to create discoloration in stocks in which it is placed.

Another unique feature of p,p'-oxybis (benzene sulfonyl hydrazide) is the facility with which it can be prepared. The preparation of many compounds of the sulfonyl hydrazide class is attended by difficulties which make their commercial utilization impractical. This is particularly true of compounds containing two sulfonyl hydrazide groups in the molecule. In the preparation of p,p'-bis (benzene sulfonyl hydrazide) for example, the sulfonation of biphenyl is a necessary step. This reaction involves the treatment of biphenyl with chlorosulfonic acid, and the formation of undesirable by-products is difficult to avoid. The formation of xenylene 2,2'-sulfone 4,4' disulfonyl chloride, for example, is an undesirable side reaction when biphenyl is used. A further undesirable side reaction with biphenyl is the formation of biphenyl mono sulfonyl chloride. In contrast to the difficulties attending the di-chloro-sulfonation of biphenyl, the reaction of chlorosulfonic acid with diphenyl ether produces the desired oxybis (benzene sulfonyl chloride) in good yield and the product is not contaminated with an undesirable sulfone as is the case with biphenyl. Furthermore, the product is not contaminated with a mono sulfonation product, sulfonation to the disulfonated product always taking place. The oxybis (benzene sulfonyl chloride) is isolated in a sufficiently pure state by a very simple process and is readily converted to the corresponding sulfonyl hydrazide as hereinafter described. The ether oxygen in the compound has a number of rather surprising effects. It labilizes the para position for easy sulfonation and prevents the formation of the undesirable cyclic by-products. It also improves solubility of the blowing agent in the rubber or plastic mix, especially in a plastisol (i. e., a mixture of particulate resin and a plasticizer therefor) and thus provides finer cell structure than other aromatic disulfonyl hydrazides. This solubility effect carries over to the decomposition product giving desirable translucence in the blown plastic rather than the opaque effect produced by biphenyl disulfonyl hydrazide.

It can be seen that p,p'-oxybis (benzene sulfonyl hydrazide) has unique properties that set it apart as a new and unique composition of matter.

The new compound of my invention has the structure

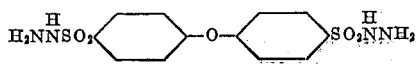

and is most conveniently made by reacting diphenyl ether with chlorosulfonic acid in known manner to give p,p'-oxybis (benzene sulfonyl chloride), which can, if desired, be isolated or purified in any suitable manner and which is subsequently reacted with hydrazine to give the new compound of my invention. The reaction with hydrazine can be effected by simply commingling the two reactants at any suitable temperature, which can conveniently range from atmospheric or room temperature (circa 20° C.) to 100° C. The reaction is preferably carried out in an inert liquid medium such as water, ethanol, methanol, and dioxane. I prefer to employ a substantial molar excess of hydrazine in order to ensure complete consumption of the p,p'-oxybis (benzene sulfonyl chloride) reactant. The excess of hydrazine is easily separated from the product, the product being precipitated and recovered by filtration; the product can be freed from any residual hydrazine by simple water washing since hydrazine is readily soluble in water whereas the product is much less water-soluble.

The reaction between p,p'-oxybis (benzene sulfonyl chloride) and hydrazine is illustrated as follows:

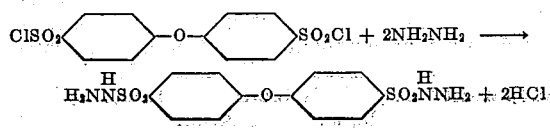

It will be seen that complete reaction requires 2 mols of hydrazine per mol of p,p'-oxybis (benzene sulfonyl chloride). It is often preferred to carry out the reaction in the presence of a hydrogen chloride acceptor (an excess of hydrazine) which promotes the reaction in the desired direction by displacing the equilibrium rightwardly in the above equation.

The use of aromatic sulfonyl hydrazides generally and of p,p'-oxybis (benzene sulfonyl chloride) specifically as blowing agents for organic plastic materials is described and claimed in the copending application of Byron A. Hunter and Ruth L. Stander, Serial No. 176,084, filed July 26, 1950.

*Example* p,p'-Oxybis (benzene sulfonyl hydrazide) was prepared by reacting p,p'-oxybis (benzene sulfonyl chloride) (Suter, J. Am. Chem. Soc. 53, 1112 (1931)) with four moles of hydrazine in the presence of ethyl alcohol as a reaction medium. The two reactants are simply brought together in the presence of the ethyl alcohol and allowed to stand at room temperature until reaction is substantially complete. After completion of the reaction the solid product was filtered off and washed well with water. The crude product did not melt but decomposes with evolution of gas at 135–140° C. The compound may be recrystallized from water, whereupon the decomposition point is increased to 161° C. Analysis of the purified material gave sulfur 17.64% and nitrogen 16.30%. The values calculated for $C_{12}H_{14}S_2O_5N_4$ are sulfur 17.78% and nitrogen 15.64%. The product was used with outstanding success for blowing rubber and polyvinyl chloride-plasticizer mixtures.

Having thus described my invention, what I claim and desire to protect by Letters Patent is:

As a new chemical compound, p,p'-oxybis (benzene sulfonyl hydrazide).

DWIGHT L. SCHOENE.

No references cited.